July 9, 1968          R. J. MEGARGLE ET AL          3,391,960
                      MOTOR VEHICLE INTERIOR
Filed Dec. 29, 1965                               4 Sheets-Sheet 4
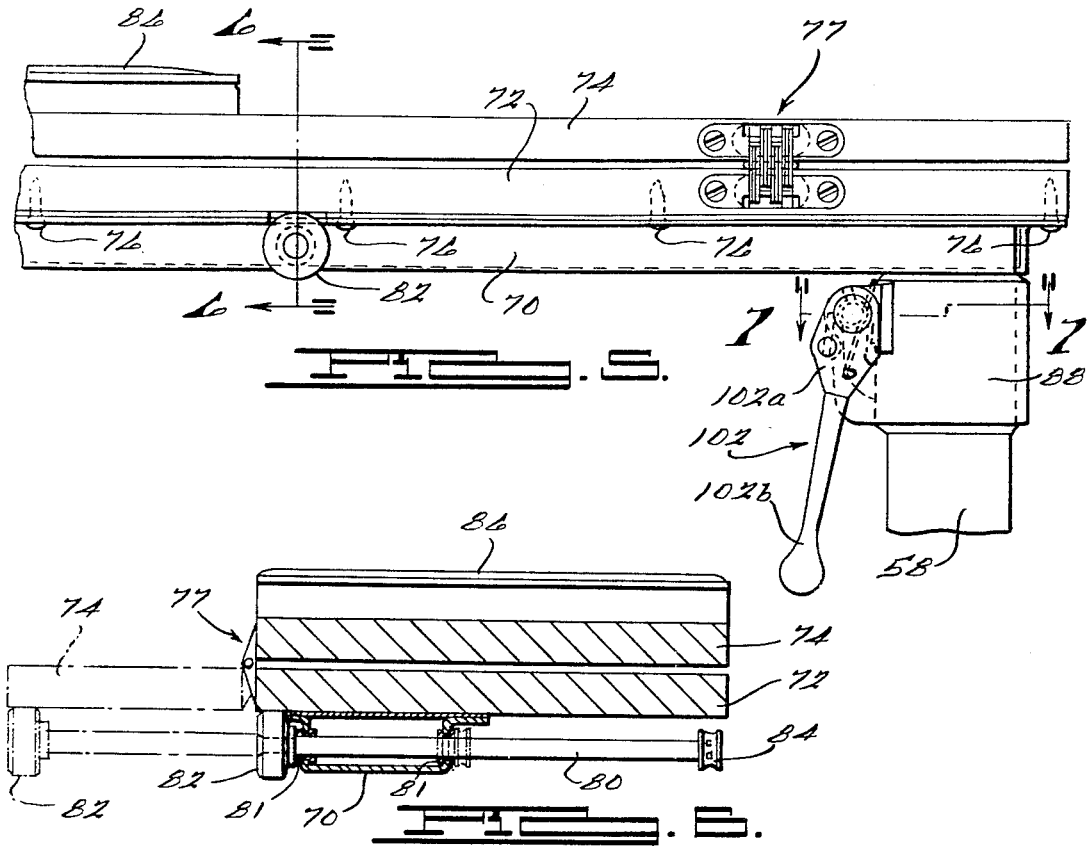
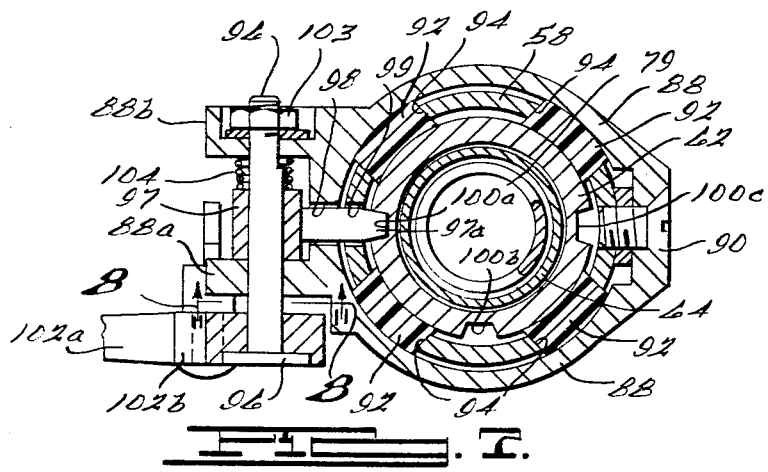
INVENTORS.
Robert J. Megargle,
David F. Long,
William V. Bachmann
BY
Harness and Harris
ATTORNEYS — # United States Patent Office 3,391,960
Patented July 9, 1968

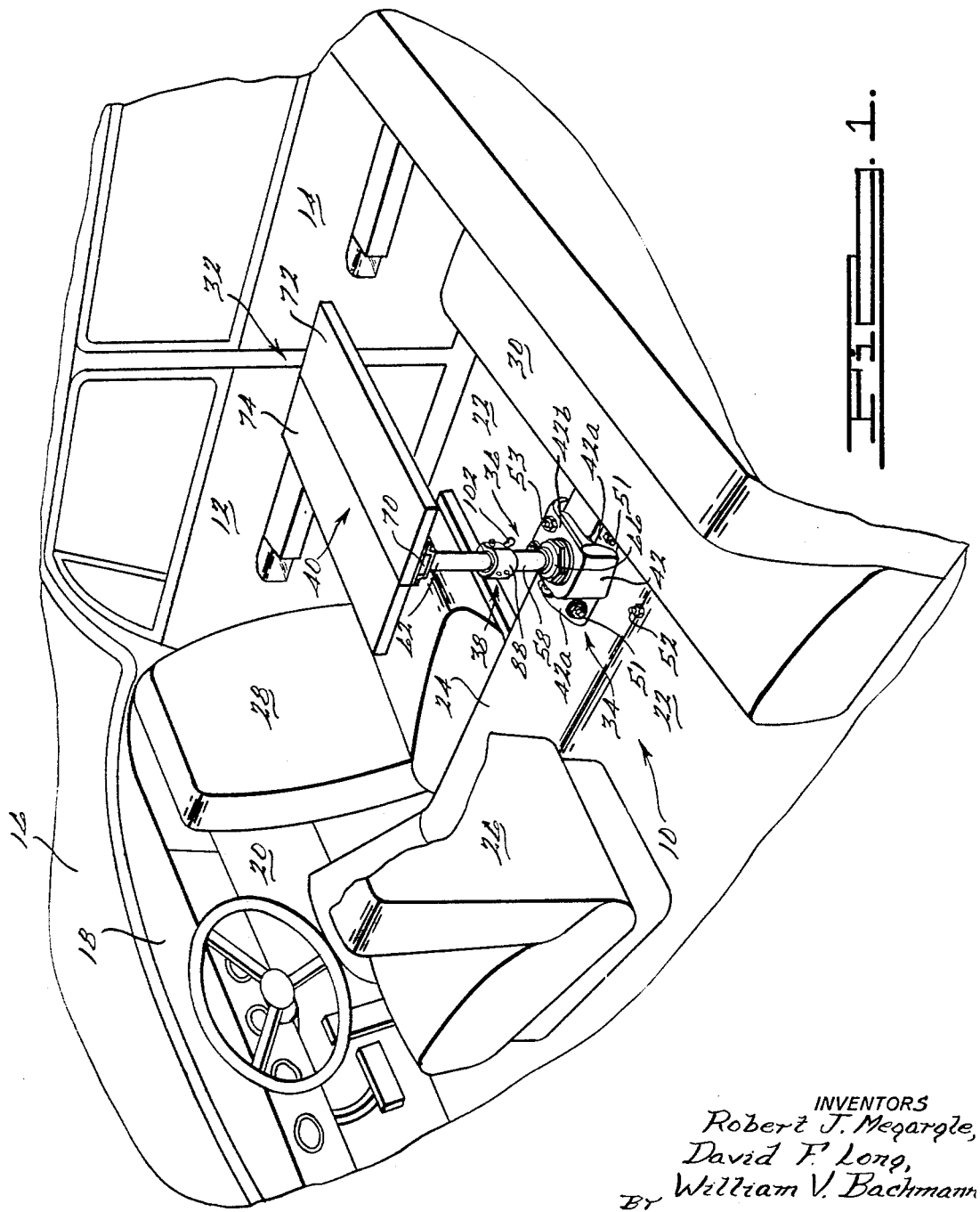

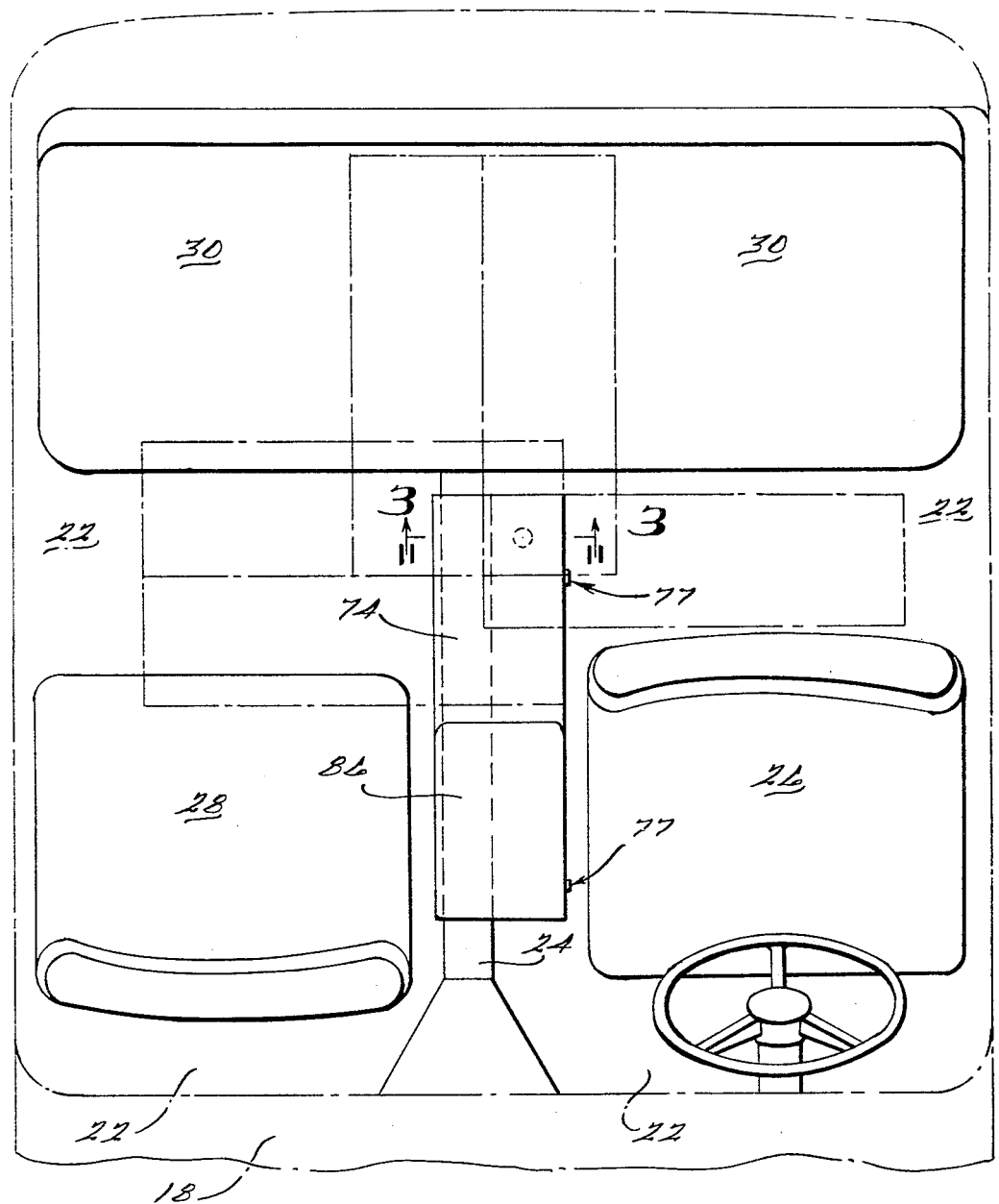

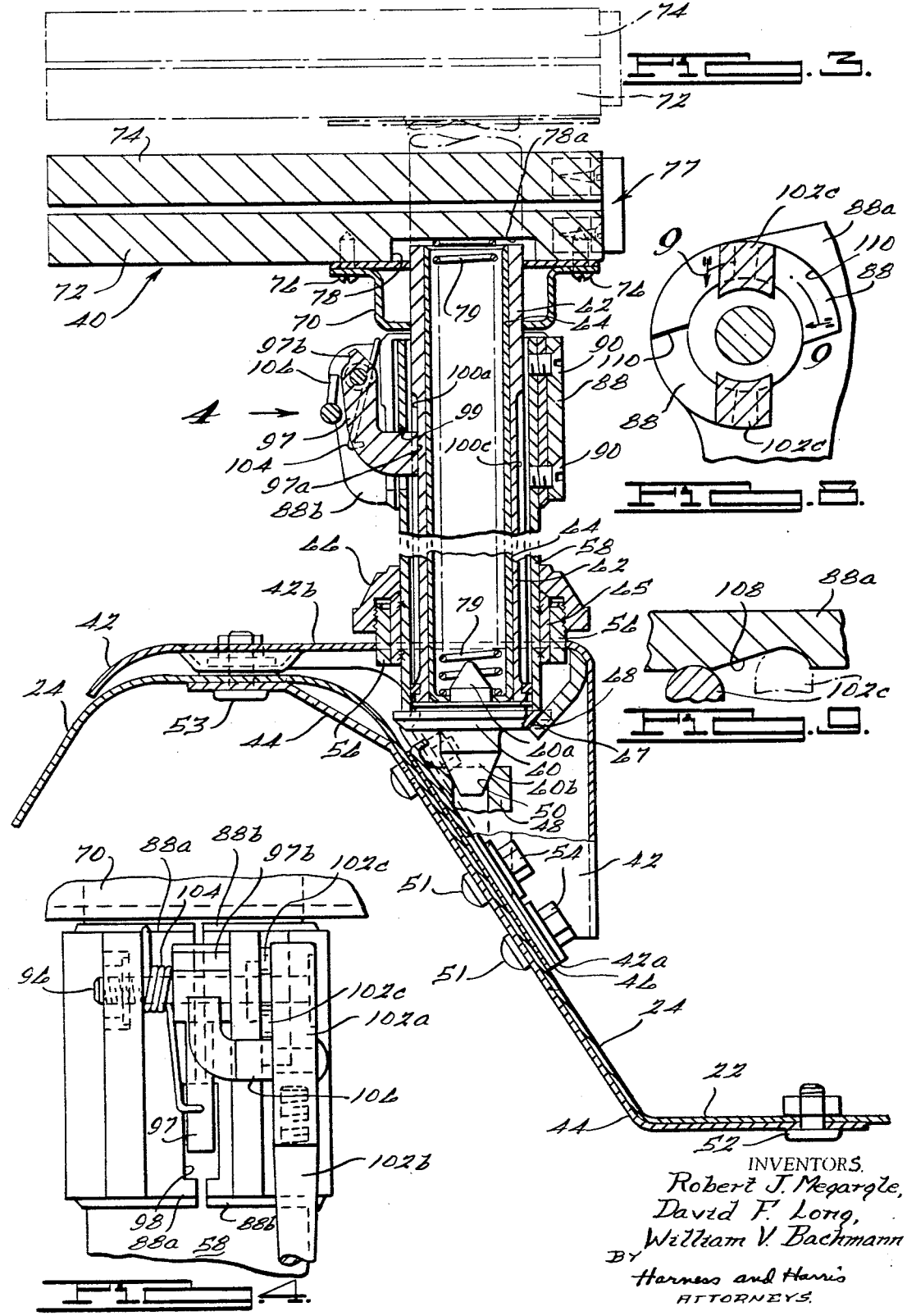

3,391,960
MOTOR VEHICLE INTERIOR
Robert J. Megargle, Grosse Pointe Park, David F. Long, Birmingham, and William V. Bachmann, St. Clair Shores, Mich., assignors to Chrysler Corporation, Highland Park, Mich., a corporation of Delaware
Filed Dec. 29, 1965, Ser. No. 517,336
14 Claims. (Cl. 296—24)

ABSTRACT OF THE DISCLOSURE

A front passenger swivel seat and table assembly for an automobile wherein a table is mounted within the passenger compartment for selective movement between a plurality of angularly spaced positions. In one position it extends generally forwardly and assumes a position between the driver's seat and the front passenger seat where its upper surface provides an arm rest for use by front seat occupants. In another position it extends generally laterally and is disposed rearwardly of the front passenger seat where it may serve as a table for use by an occupant of the front passenger seat with that seat swiveled to face rearwardly.

---

This invention relates to a motor vehicle interior. More particularly, it relates to a passenger compartment for a motor vehicle embodying a novel table assembly.

It is an object of the present invention to provide an improved motor vehicle interior.

A more specific object is to provide a motor vehicle interior especially adapted to serve as a mobile office or lounge.

A yet more specific object is to provide a novel table assembly for use in the passenger compartment of a motor vehicle.

Yet another object is to provide a table assembly as aforesaid which is movable selectively within the passenger compartment between a plurality of positions and which provides in each such position a work and/or support surface for use by the occupants of one or more of the seat means within the passenger compartment.

According to one important feature of the invention, an elongate table top is mounted within the passenger compartment of a motor vehicle for selective movement between a first position in which it extends laterally of the vehicle between the front and rear seats and a second position in which it extends longitudinally of the vehicle.

According to a more specific feature of the invention, the front seat means of the vehicle comprises a driver's seat and a separate passenger seat positioned in spaced relation beside the driver's seat, and the table top in its aforesaid second or longitudinally extending position lies between the driver's and passenger seats to provide a center armrest.

According to another feature of the invention, the front passenger seat has a rearwardly facing position and the table top in its aforesaid first or laterally extending position is disposed directly rearwardly of the passenger seat to provide a convenient work surface for a rearwardly facing occupant of that seat.

According to yet another feature of the invention, means are provided for selectively adjusting the height of the table top so that the latter may assume a relatively low position when positioned between the seats for use as an armrest and a relatively high position when positioned rearwardly of the passenger seat for use as a work surface.

According to another feature of the invention, the mounting means for the table top comprise means mounting the latter for pivotal movement about a generally vertical axis which is located generally adjacent the longitudinal center line of the vehicle between the front and rear seat means and which intersects the table top adjacent one end of the latter so that the table top may be swung in cantilever fashion between its aforesaid positions.

According to a still further feature of the invention, the table top comprises two elongate plate members hingedly connected along adjacent lengthwise side edges so that the plates may assume a folded or superimposed relationship when the table top is positioned between the seats as an armrest and may be unfolded to extend the work surface when the table top is in its position rearwardly of the passenger seat.

These and other objects, features and advantages of the invention will be apparent from the following detailed description of a preferred embodiment of the invention and from the accompanying drawings wherein:

FIG. 1 is a fragmentary perspective view of a motor vehicle body having a table and seat assembly according to the invention, the table top being shown in its laterally extending position rearwardly of the front passenger seat;

FIG. 2 is a plan view of the table and seat assembly of FIG. 1, the table top being shown in its longitudinally extending position between the front seats;

FIG. 3 is a sectional view taken on line 3—3 of FIG. 2 and showing details of the mounting structure for the table assembly;

FIG. 4 is a fragmentary detail view looking in the direction of the arrow 4 in FIG. 3;

FIG. 5 is a fragmentary view of the table assembly with the table top turned through ninety degrees from its position of FIG. 3;

FIGS. 6 and 7 are sectional views taken on lines 6—6 and 7—7, of FIG. 5.

FIG. 8 is a fragmentary sectional view taken on line 8—8 of FIG. 7; and

FIG. 9 is a fragmentary sectional view taken on line 9—9 of FIG. 8.

Detailed description

The motor vehicle shown fragmentarily in FIG. 1 provides a passenger compartment 10 defined in part by a right front door 12, right rear door 14, windshield 16, instrument panel 18, toe board 20, floor pan 22, and drive shaft tunnel 24.

A driver's seat 26 is supported on floor pan 22 within passenger compartment 10 and a passenger's seat 28 is positioned beside driver's seat 26 at the opposite side of drive shaft tunnel 24. A forwardly facing rear seat 30 of the bench type is positioned within passenger compartment 10 in rearwardly spaced relation to front seat means 26, 28. Passenger seat 28 is mounted (by means not shown) for swivelling movement between a generally forwardly facing position and the illustrated generally rearwardly facing position. Swivel structure suitable for mounting seat 28 for its aforesaid pivotal movement is disclosed in United States Patent No. 3,322,458 assigned to the assignee of the present application.

A table assembly, seen generally at 32 is positioned within compartment 10. Table assembly 32 includes a base structure 34, post structure 36, locking structure 38, and table top assembly 40.

Base structure 34 is best seen in FIGS. 1 and 3. It includes an adapter plate 42 having wing portions 42a, a backing plate 44, and a reinforcing plate 46 carrying a block 48 defining a conical socket 50. Bolts 51 pass successively through backing plate 44, drive shaft tunnel 24, reinforcing plate 46, and wing portions 42a of adaptor 42 to threadably engage nuts 54 and mount plate 42 in a position where it defines a generally horizontal platform 42b extending laterally from the longitudinal center line of the vehicle. Another bolt 52 fastens the lower end of backing plate 44 to floor pan 22 and further bolts 52 fasten mounting plate 42 and the upper end of backing plate 44 to the top wall of drive shaft tunnel 24. A pipe section 56 is rigidly positioned within a hole in platform 42b.

Post structure 36 includes an outer tube 58, a plug 60 rigidly positioned within the lower end of outer tube 58, an inner tube 62 telescopically received within outer tube 58, and a plastic tube 64 received concentrically within tube 62 and positioned at its lower end over a conical pilot portion 60a upstanding centrally from the main body portion of plug 60. Post structure 36 is passed through pipe section 56 with a depending conical pilot portion 60b on plug 60 guiding into socket 50 and a collar 65 on outer tube 58 seating concentrically within pipe section 56. A nut 66 screws onto the upper threaded end of pipe section 56 and coacts with the chamfered upper edge of collar 65 to preclude vertical displacement of outer tube 58 relative to base structure 34, and a finger 67 carried on adaptor plate 42 coacts with a notch 68 in plug 60 to preclude rotation of outer tube 68 relative to base structure 34. Post structure 36 is thus mounted within the passenger compartment in an upright position between the front and rear seat means and slightly to one side of the longitudinal center line of the vehicle as defined by the center of driveshaft tunnel 24.

Table top assembly 40 is best seen in FIGS. 3, 5 and 6 and includes an elongate U channel member 70 and a pair of plate or board members 72, 74. Channel member 70 is rigidly secured at its one end to upper end of telescoping tube 62 so as to extend in cantilever fashion from post structure 36. Plate or board member 72 overlies channel member 70 and is secured thereto by screws 76, and plate or board member 74 is hingedly secured along one lengthwise edge to the adjacent lengthwise side edge of plate member 72. These hinge means may take any form but preferably comprise a pair of hinges 77 available from Soss Manufacturing Company of Detroit, Mich., as Soss Invisible Hinge No. 204. The upper end of inner tube 62 is received in a pocket or recess 78 in the adjacent lower face of plate 72 and a coil spring 79 received within plastic tube 64 presses upwardly against floor surface 78a of recess 78 to continuously bias table top assembly 40 and inner tube 62 in an upward direction.

Table top assembly 40 further includes a prop member 80 mounted in bearing members 81 in U channel 70 for sliding movement between a stowed position (seen in solid lines in FIG. 6) in which it underlies plate member 72 and a working position (seen in phantom in FIG. 6) in which it extends laterally from plate member 72 to support plate member 76 when the latter is pivoted about the axis of hinges 77 to its unfolded position (seen in phantom in FIG. 6 and in solid lines in FIG. 1) to form a leaf laterally extending the work surface of plate member 72. A plastic disc 82 carried on one end of prop 80 provides the actual contact surface with plate member 76 and a plastic disc 84 on the other end of prop 80 provides a stop to limit the laterally outward sliding movement of prop 80.

Table assembly 40 also includes a generally rectangular pad 86 secured to plate member 76 and overlying that member with the latter in its folded position overlying plate member 72. As best seen in FIG. 2, pad 86 covers only a portion of the adjacent surface of plate member 76.

Locking structure 38 is best seen in FIGS. 3, 4, 5 and 7 through 9. It includes a split collar 88 encircling an upper portion of outer tube 58 and held against rotation relative to that tube by set screws 90, a plurality of arcuate shoe segments 92 slidably received in windows 94 formed in outer tube 58 at circumferentially spaced locations therearound, a clamping bolt 96 passing through aligned apertures in spaced leg portions 88a, 88b of collar 88, a dog 97 swingably mounted at one end on bolt 96 between legs 88a, 88b and passing at its other end through a slot 98 defined between the spaced ends of split collar and a window 99 in outer tube 58 for engagement at its tip end 97a with one of a plurality of circumferentially spaced, axially extending grooves 100a, b, c formed in the exterior face of inner tube 62, and a locking lever 102 having a hub portion 102a journalled on one end of bolt 96 and a handle portion 102b extending generally radially from hub portion 102a.

A nut 103 is threaded onto the end of bolt 96 remote from locking lever 102 and a coil spring 104 is wound around bolt 96 and bears against dog 98 to continuously bias the tip end 98a of the latter into engagement with a groove 100. An L-shaped leg 106 is secured to hub portion 102a of locking lever 102 for coaction with an ear portion 98b of dog 98.

A pair of camming members 102c are raised from the axially inner face of locking lever hub portion 102b for camming coaction with a pair of ramp surfaces 108 defined by the sloping floors of a pair of arcuate grooves 110 formed in the adjacent face of arm portion 88a of clamping collar 88.

*Operation*

Table top assembly 40 normally extends forwardly in cantilever fashion from post structure 36 with plate member 74 overlying plate member 72 to position pad 86 between driver's seat 26 and passenger seat 28 where it provides an armrest for an occupant of either or both of these seats. In this position, table assembly 40 extends generally parallel to the longitudinal center line of the vehicle. Inner tube 62 will normally be telescoped completely into outer tube 58 to dispose top assembly 40 in a relatively low position befitting its use as an armrest for front seat occupants. Locking lever 102 is in its generally downwardly extending position (best seen in FIG. 5) so that camming members 102c engage the shallowest portions of the respective sloping grooves 110 to press collar arms 88a and 88b together and clamp collar 88 tightly around arcuate shoe segments 92 to press the latter against the outer surface of inner tube 62 and thereby preclude movement of the table top assembly.

In its position between front seats 26, 28, table top assembly 40 may be selectively raised or lowered to vary the height of pad 86 to suit the stature of the particular seat occupant(s). To raise the table top assembly, locking lever 102 may be raised slightly (pivoted clockwise as viewed in FIG. 5) to move camming members 102c along ramp surfaces 108 to a relatively deep portion of the respective grooves 110, whereby to allow arm portions 88a and 88b to spread apart by their own resilience and allow shoe segments 92 to move radially outwardly to release their clamping engagement of inner tube 62. Inner tube 62 may now be moved upwardly relative to fixed outer tube 58 to move top assembly 40 to the desired height. Coil spring 79 extends during this upward movement to provide a spring assist. After the table top assembly has been positioned at the desired height, locking lever 102 may be moved downwardly (counterclockwise in FIG. 5) to again lock tube 62 to tube 58 by the wedging coaction of camming member 102c and ramp surfaces 108. The table assembly of the invention thus provides a vertically adjustable center armrest for the front seat occupants of a motor vehicle.

Table top assembly 40 is also movable to a plurality of other angularly varying positions within the passenger compartment and provides in each such position a work or support surface for use by the occupant(s) of one or more of the seats.

To vary the angular position of the table top assembly 40, locking lever 102 is moved upwardly (clockwise in FIG. 5). The first portion of this upward or clockwise movement releases shoe segments 92, in the manner previously described. Further upward or clockwise movement of lever 102 brings the free end of leg 106 on locking lever 102 into engagement with ear portion 98b of dog 98, whereby to pivot dog 98 upward (clockwise in FIG. 3) and move its tip end 98a out of groove 100a in inner tube 62. Inner tube 62 is now free to rotate within fixed outer tube 58 so that table assembly 40 may now be freely pivoted about the axis of post structure 36 to a new angular position within the passenger compartment.

For example, after swivelling front passenger seat 28 to its rearwardly facing position, table top assembly 40 may be swung clockwise (as viewed in FIG. 2) through ninety degrees to a position generally rearwardly of passenger seat 28. In this position, best seen in FIG. 1, the table assembly extends generally transverse to the longitudinal center line of the motor vehicle. When pivoting table top assembly from its generally forwardly extending position between the front seats to its transverse position rearwardly of the front passenger seat, locking lever 102 is raised as previously described to an extent to clear tip end 98a of dog 98 from groove 100a, whereafter, after a small amount of pivoting movement of the table assembly, locking lever 102 may be released to allow tip end 98a to ride on the smooth cylindrical outer surface of inner tube 62 so that it will be moved positively by spring 104 into the next successive groove 100b as the table assembly reaches its position of FIG. 1. Dog 98 and grooves 100 thus coact to provide detent means defining a plurality of spaced angular positions of the table top assembly.

With table assembly 40 in its position rearwardly of passenger seat 28, plate member 74 will normally be unfolded, as seen in FIG. 1, to relegate pad 86 to an out-of-the-way position beneath plate 74 and provide a smooth, uninterrupted work surface equal in area to the combined surface areas of plates 72, 74. In its unfolded position, plate member 74 is supported by extended prop member 80. The height of the table top assembly may be course be adjusted to suit the peculiar stature of the user. The table top assembly will normally be adjusted to a relatively low position when disposed as an armrest between the front seats and a relatively high position when disposed as a table rearwardly of seat 28. In its position rearwardly of passenger seat 28, the work surface provided by the table top assembly may be used by an occupant of rearward facing seat 28 and/or by an occupant of the portion of rear seat 30 directly behind seat 28. The aforesaid rear seat occupant may also use the table assembly in its folded condition with the front seat 28 in its forwardly facing position.

Table top assembly 40 may also be swung to a generally rearwardly extending position, seen in phantom in FIG. 2 in which it centrally overlies rear seat 30 to provide a central armrest and/or work surface for rear seat occupants. The available work surface may be extended as previously described by moving plate 74 to its unfolding position. A groove 100c coacts with dog tip end 98a to provide detent means defining the rearwardly extending position.

Table top assembly may also be swung through an additional ninety degrees to a laterally extending position, seen in phantom in FIG. 2 generally rearwardly of driver's seat 26 where it may be used in folded condition by an occupant of the portion of rear seat 30 directly behind driver's seat 26. This position of the table top assembly is not detented since to do so would potentially interfere with movement of driver's seat 26 to its extreme rearward position of adjustment.

Although a preferred embodiment of the invention has been illustrated and described in detail, it will be understood that various changes may be made in the disclosed embodiment without departing from the scope or spirit of the invention as defined by the appended claims.

We claim:
1. A motor vehicle comprising
 (A) a body structure defining a passenger compartment having a floor;
 (B) front seat means supported on said floor in the forward portion of said compartment;
 (C) rear seat means supported on said floor in the rearward portion of said compartment in spaced relation to said front seat means; and
 (D) a table assembly including
  (1) a post supported on the portion of said floor between said front and rear seat means and extending upwardly therefrom, and
  (2) a generally elongated table top mounted on said post for swiveling movement about the central upright axis of said post with said axis intersecting said table top adjacent one end of the latter so that as said table top is swiveled on said axis it passes through a series of angularly spaced positions in which it extends in cantilever fashion from said post in varying directions.

2. A motor vehicle comprising
 (A) a body structure defining a passenger compartment having a floor;
 (B) a passenger seat mounted on said floor for swiveling movement about a generally vertical axis between a generally forwardly facing position and a generally rearwardly facing position;
 (C) a forwardly facing driver's seat supported on said floor beside said passenger seat; and
 (D) a table assembly including a table top supported within said passenger compartment in a position generally rearwardly of said passenger seat and spaced above said floor so as to define at its top face a work surface usable by an occupant of said passenger seat with the latter in its rearwardly facing position.

3. A motor vehicle comprising
 (A) a body structure defining a passenger compartment having a floor;
 (B) a passenger seat supported on said floor and having at least a generally rearwardly facing position;
 (C) a forwardly facing driver's seat supported on said floor in laterally spaced relation to said passenger seat;
 (D) a table assembly including
  (1) a table top, and
  (2) means mounting said table top for movement between a first position generally rearwardly of said passenger seat and spaced above said floor so as to define at its top face a work surface usable by an occupant of said passenger seat, and another position in which it is positioned between said passenger and driver's seat to provide a center arm rest for occupants of said seats.

4. A motor vehicle according to claim 3, and further including means for selectively adjusting the height of said table top, whereby said table top may assume a relatively low position when positioned between said seats for use as an armrest and a relatively high position when positioned rearwardly of said passenger seat for use as a work surface.

5. A motor vehicle according to claim 4 wherein
 (A) said table top is generally elongated;
 (B) said table top mounting means includes means defining a generally upright pivot axis located generally adjacent the longitudinal center line of said motor vehicle and rearwardly of said seats; and
 (C) said pivot axis intersects said table top adjacent one end of the latter, so that in its position rearwardly of said passenger seat said table top extends generally laterally from said axis and in its position between said seats said table top extend generally forwardly from said axis.

6. A motor vehicle according to claim 5, and further including detent means for selectively locking said table top in each of its aforesaid positions.

7. A motor vehicle according to claim 5 wherein
 (A) forwardly facing rear seat means are also disposed within said passenger compartment in a position spaced rearwardly from said passenger and driver's seats and (B) said table top is pivotable about said axis to a third position in which it extends generally rearwardly from said axis to provide a work surface for use by an occupant of said rear seat means.

8. A motor vehicle according to claim 5 wherein said table top comprises:
   (A) a first elongate plate member;
   (B) a second elongate plate member; and
   (C) means hingedly securing one lengthwise side edge of said first plate member to the adjacent lengthwise side edge of said second plate member so that said second plate member constitutes a leaf which may assume a superimposed position with respect to said first plate member when said table top is in its position between said seats and may be unfolded to extend said work surface when said table top is in its position rearwardly of said passenger seat.

9. A motor vehicle according to claim 8 wherein said passenger seat is mounted for swivelling movement between its aforesaid generally rearwardly facing position and a generally forwardly facing position.

10. A motor vehicle according to claim 8 and further including a prop mounted for sliding movement between
    (A) a stowed position in which it underlies said first plate member and
    (B) a working position in which it extends laterally from said one lengthwise side edge of said first plate member to support said second plate member in the unfolded position of the latter.

11. A motor vehicle according to claim 10 wherein said table top is also pivotable about said axis to a fourth position in which it extends laterally from said axis and is positioned directly behind said driver's seat to provide a work surface for an occupant of the portion of said rear seat means directly behind said driver's seat.

12. A motor vehicle comprising
    (A) a body structure defining a passenger compartment having a floor;
    (B) front seat means supported on said floor in the forward portion of said compartment;
    (C) rear seat means supported on said floor in the rearward portion of said compartment in spaced relation to said front seat means;
    (D) an elongate table top; and
    (E) means for selectively positioning said table top within said motor vehicle in
       (1) a first position in which it extends between said seats in a direction generally transverse to the longitudinal center line of said vehicle and
       (2) a second position in which it extends in a direction generally parallel to said center line.

13. A motor vehicle according to claim 12 wherein
    (A) said front seat means comprises
       (1) a driver's seat and
       (2) a passenger seat positioned beside, but spaced laterally from said driver's seat, and
    (B) said table top in its aforesaid second position lies between said driver's and passenger's seats to provide a center armrest.

14. A motor vehicle according to claim 12 wherein said positioning means comprises means mounting said table top for pivotal movement about a generally vertical axis located generally adjacent the longitudinal center line of said vehicle between said front and rear seat means and intersecting said table top adjacent one end of the latter, whereby said table top pivots as a cantilever about said axis.

References Cited

UNITED STATES PATENTS 2,542,032  4/1952  Henderson _____ 108—45 X
3,058,769  10/1962  Willson _____ 296—23

FOREIGN PATENTS 933,913  10/1955  Germany.

PHILIP GOODMAN, *Primary Examiner.*